US008157528B1

(12) United States Patent
Khozikov et al.

(10) Patent No.: US 8,157,528 B1
(45) Date of Patent: *Apr. 17, 2012

(54) ACTIVE DIRECTIONAL CONTROL OF AIRFLOWS OVER ROTORCRAFT BLADES USING PLASMA ACTUATING CASCADE ARRAYS

(75) Inventors: Vyacheslav Khozikov, Seattle, WA (US); Shengyi Liu, Sammamish, WA (US); George M. Roe, Seattle, WA (US)

(73) Assignee: The Boeing Company, Chicago, IL (US)

( * ) Notice: Subject to any disclaimer, the term of this patent is extended or adjusted under 35 U.S.C. 154(b) by 361 days.

This patent is subject to a terminal disclaimer.

(21) Appl. No.: 12/432,451

(22) Filed: Apr. 29, 2009

(51) Int. Cl.
*B64C 27/46* (2006.01)
(52) U.S. Cl. .................................. 416/146 R
(58) Field of Classification Search ............. 416/146 R; 244/205
See application file for complete search history.

(56) References Cited

U.S. PATENT DOCUMENTS

| | | | |
|---|---|---|---|
| 3,095,163 A | 6/1963 | Hill | |
| 4,519,743 A | 5/1985 | Ham | |
| 5,224,826 A | 7/1993 | Hall et al. | |
| 6,033,180 A | 3/2000 | Machida | |
| 6,092,990 A | 7/2000 | Hassan et al. | |
| 6,793,177 B2 | 9/2004 | Bonutti | |
| 6,796,533 B2 | 9/2004 | Barrett et al. | |
| 7,028,954 B2 * | 4/2006 | Van Dam et al. ............. | 244/204 |
| 7,281,318 B2 * | 10/2007 | Marshall et al. ................ | 29/621 |
| 7,380,756 B1 | 6/2008 | Enloe et al. | |
| 7,387,491 B2 | 6/2008 | Saddoughi et al. | |
| 2008/0023589 A1 * | 1/2008 | Miles et al. ................... | 244/205 |
| 2010/0127624 A1 | 5/2010 | Roy | |
| 2011/0150649 A1 | 6/2011 | White | |

FOREIGN PATENT DOCUMENTS

| | | |
|---|---|---|
| EP | 1930546 | 6/2008 |
| EP | 1995171 | 11/2008 |
| WO | 2008016928 | 2/2008 |

OTHER PUBLICATIONS

Santhanakrishanan, et al., "Flow Control With Plasma Synthetic Jet Actuators," Journal of Physics D: Applied Physics, 2007, p. 637-651, vol. 40, Issue 3.
Jayaraman, et al., "Modeling of Dielectric Barrier Discharge Plasma Actuator," Journal of Applied Physics, 2008, vol. 103, Issue 5.
Hultgren, et al., "Demonstration of Separation Delay With Glow-Discharge Plasma Actuators," NASA, Dec. 2004, p. 1-15; American Institute of Aeronautics and Astronautics, Inc. (AIAA) 2003-1025.

(Continued)

*Primary Examiner* — Chandra Chaudhari
(74) *Attorney, Agent, or Firm* — Hope Baldauff Hartman, LLC

(57) ABSTRACT

Methods of constructing plasma actuating cascade arrays for actively controlling airflow over rotorcraft blades are described herein. These methods may include providing plasma actuating cascade arrays that include dielectrics and electrodes. The electrodes and dielectrics are electrically operated to generate plasma clusters, and to induce directional airflows in response to the plasma clusters. The methods may also include configuring the plasma actuating cascade arrays based, at least in part, on characteristics of the rotorcraft blades and characteristics of flight regimes and scenarios.

24 Claims, 15 Drawing Sheets

OTHER PUBLICATIONS

Post, et al., "Separation Control Using Plasma Actuators—Dynamic Stall Control on an Oscillating Airfoil," American Institute of Aeronautics and Astronautics, Inc., (AIAA)—2004-2517; $2^{nd}$ AIAA Flow Control Conference, Jun. 28-Jul. 1, 2004, Portland, Oregon.

U.S. Appl. No. 12/273,650 entitled "Disbanded Cascaded Array for Generating and Moving Plasma Clusters for Active Airflow Control" filed Nov. 19, 2008.

U.S. Appl. No. 12/472,116 entitled "Active Directional Control of Airflows Over Wind Turbine Blades Using Plasma Actuating Cascade Arrays" filed May 26, 2009.

U.S. Official Action dated Aug. 11, 2011 in U.S. Appl. No. 12/474,116.

U.S. Official Action dated Sep. 8, 2011 in U.S. Appl. No. 12/273,650.

International Search Report and Written Opinion dated Feb. 16, 2010 in PCT/US2009/064426.

U.S. Notice of Allowance dated Dec. 12, 2011 in U.S. Appl. No. 12/472,116.

U.S. Notice of Allowance dated Feb. 2, 2012 in U.S. Appl. No. 12/273,650.

* cited by examiner

ACTIVE DIRECTIONAL CONTROL OF AIRFLOWS OVER ROTORCRAFT BLADES USING PLASMA ACTUATING CASCADE ARRAYS

FIELD OF THE DISCLOSURE

This disclosure pertains generally to actively controlling directional airflows moving over rotorcraft blades, and pertains more specifically to plasma actuating cascade arrays for actively generating and moving plasma clusters to manage these directional airflows.

BACKGROUND

In a variety of different aerodynamic scenarios, airflows occurring over rotorcraft blades may become turbulent, and in some cases, may reduce the lift and increase drag characteristics of the rotorcraft blades. The alternation of these characteristics may result in reduced overall aerodynamic efficiency, as well as stability, lift characteristics and increased fuel consumption.

Previous techniques have addressed this issue by providing various types of active airflow control systems. However, these previous techniques typically involve mechanical, electromechanical, or pneumatic systems. Further, installing or retrofitting such systems may involve significant modification of the structure underlying the airfoil. Thus, these previous systems may be expensive to implement, in terms of cost and labor to install or retrofit onto existing airfoils.

In addition, some previous active airflow control systems incorporate several electrodes disposed along a single given dielectric. However, such systems may not efficiently utilize the surface area of an airfoil that would otherwise be available for generating plasma. For example, if the electrodes are located too close to one another, counterforces may form between adjacent electrodes. These counterforces may result in smaller, weaker clusters of plasma, which are less effective in generating bulk airflows.

To reduce the formation of these counterforces, these previous active airflow control systems may increase the distances between the electrodes along the single dielectric. However, these increased distances between electrodes may result in fewer plasma-generating units per unit of surface area on the airfoil. This decreased concentration of plasma-generating units, in turn, may reduce the efficiency of these previous airflow control systems in influencing bulk airflows.

SUMMARY

It should be appreciated that this Summary is provided to introduce a selection of concepts in a simplified form that are further described below in the Detailed Description. This Summary is not intended to be used to limit the scope of the claimed subject matter.

According to an embodiment, methods of constructing plasma actuated cascade arrays for actively controlling airflow over rotorcraft blades are described herein. These methods may include providing plasma actuated cascade arrays that include dielectrics and electrodes. The electrodes and dielectrics are electrically operative to generate plasma clusters, and to induce directional airflows in response to the plasma clusters. The methods may also include configuring the plasma actuating cascade arrays based, at least in part, on characteristics of the rotorcraft blades.

In another embodiment, a method is disclosed for implementing plasma actuated cascade arrays onto rotorcraft blades, for actively controlling airflows over the rotorcraft blades. These methods may include providing the plasma actuated cascade arrays. The plasma actuated cascade arrays include dielectrics and electrodes, with the electrodes and dielectrics are electrically operative to generate plasma clusters, thereby inducing directional airflows associated with the plasma clusters. The methods may also include installing the plasma actuating cascade arrays onto the rotorcraft blades.

In another embodiment, a method is disclosed for actively controlling directional airflow passing over a rotorcraft blade, using a plasma actuated cascade array installed onto the rotorcraft blade. The method may include providing electrical power in the form of a custom waveform to the plasma actuated cascade array. The custom waveform may be defined to actively control airflows passing over the rotorcraft blades by generating plasma clusters. The method may also include generating plasma clusters proximate the plasma actuated cascade array during a first phase of the electrical power, and moving the plasma clusters along the plasma actuated cascade array in response to a further phase of the electrical power. The method may also include generating directional airflows in response to movement of the plasma clusters.

The features, functions, and advantages discussed herein may be achieved independently in various embodiments of the present description or may be combined in yet other embodiments, further details of which can be seen with reference to the following description and drawings.

DETAILED DESCRIPTION

The following detailed description discloses various tools and techniques related to active directional control of airflows over rotorcraft blades using plasma actuating cascade arrays. This description is most readily understood with reference to the attached drawings, in which like reference numbers may appear in different drawings to refer to similar elements.

For the purposes of this description, but without limiting possible implementations, the term "plasma" as used herein may refer to ionized gas or air molecules that result when the gas or air molecules pass through an electric field defined between two electrodes. Typically, the air molecules lose one or more electrons, or become split, therefore produce neutral, positively or negatively charged particles, and also release other free electrons.

Figure 1:
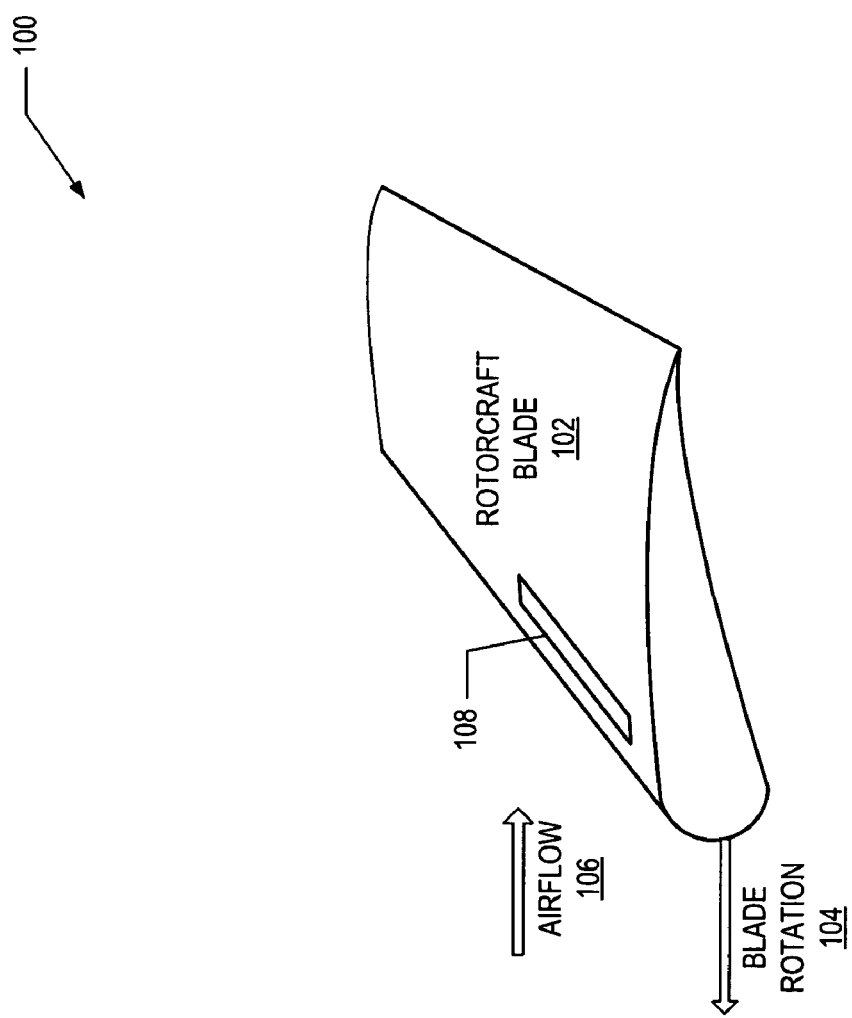
FIG. 1 is a schematic diagram illustrating systems or operating environments for performing active directional control of airflows over rotorcraft blades using plasma actuating cascade arrays.

FIG. 1 illustrates systems or operating environments, denoted generally at 100, for performing active directional control of airflows over rotorcraft blades using plasma actuating cascade arrays. These systems may include one or more rotorcraft blades 102, with any number of the rotorcraft blades 102 being rotateably attached to a given vehicle or airframe. Examples of the vehicles or airframes may include, but are not limited to, helicopters or other suitable aircraft (e.g., including but not limited to tilt rotor aircraft). These rotorcraft blades 102 may also be understood as rotary airfoils.

The rotorcraft blades 102 as shown in FIG. 1, as well as the subsequent drawings presented herein, are shown only for example to facilitate the present description, but not to limit possible implementations of this description. In addition, the rotorcraft blades 102, as well as other elements illustrated herein, are not drawn to scale, and are shown only for convenience in illustrating certain features of this description. However, implementations of this description may include rotorcraft blades 102, or elements thereof, having visual proportions or appearance different from those shown herein. For example, the rotorcraft blades 102 included in implementations of this description may have any cross-sectional profile, size, or portions, or other physical dimensions recognized as suitable for a given application.

In general, any number of the rotorcraft blades 102 may rotate around a given axis (not shown in FIG. 1), with the arrow 104 generally representing an example direction in which the rotorcraft blades 102 may rotate. As the rotorcraft blades 102 rotate around the axis, the blades 102 may face an incoming airflow, depicted generally at 106. The direction and speed of the incoming airflow 106 may vary depending upon a variety of different conditions, including for example ambient wind speed and direction, the rotational speed of the rotorcraft blades 102, the location of the rotorcraft blades 102 on a given airframe, or the like.

The rotorcraft blades 102 may include any number of plasma actuating cascaded arrays 108 (hereinafter, cascaded arrays 108), with FIG. 1 illustrating one example of the cascaded arrays 108 only for clarity of illustration. However, as illustrated and described in subsequent drawings, implementations of the rotorcraft blades 102 may include any number of the cascaded arrays 108. It is further noted that the location of the cascaded arrays 108 as shown in FIG. 1 is illustrative only, and that the cascaded arrays 108 may be located wherever appropriate on the surfaces of the rotorcraft blades 102, according to circumstances of particular implementations of this description.

In general, the rotorcraft blades 102 may include exterior surfaces that are rotated through air or gas, that also experience losses associated with drag forces imposed by the air or gas. For conciseness of description, but not to limit possible implementations, this description refers to air and gas flows collectively as airflows.

In some implementations, the cascaded arrays 108 may be installed onto the surface of the rotorcraft blades 102, without substantially modifying the structure underlying the rotorcraft blades. Aside from receiving electrical power from the vehicle, the cascaded arrays 108 may have minimal structural impact on the vehicle to which they are installed.

As described in further detail below, the cascaded arrays 108 may actively control and/or redirect airflows moving over the rotorcraft blades 102. To describe the types of control that the cascaded arrays 108 may provide, the discussion now turns to FIG. 2.

Figure 2:
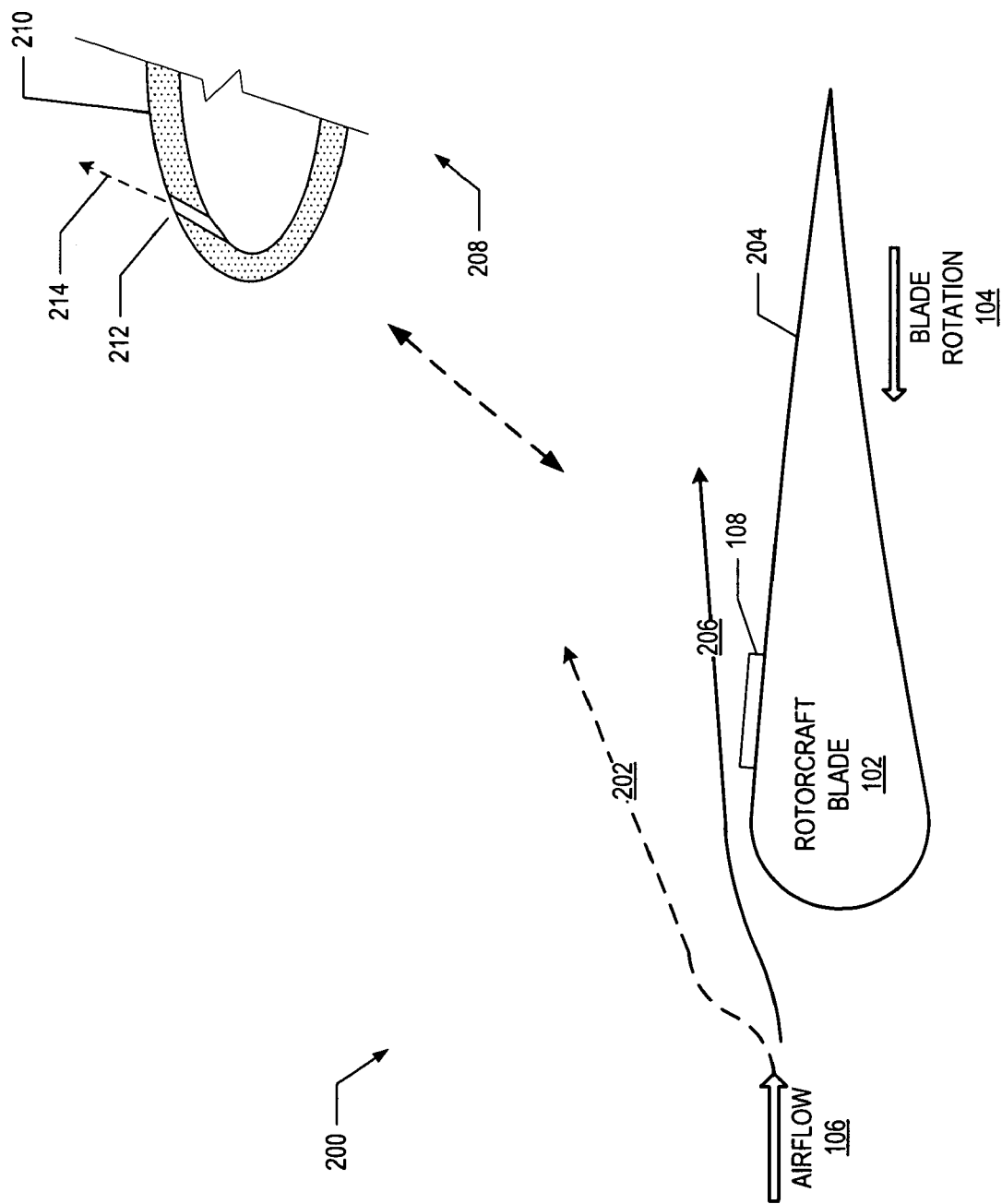
FIG. 2 is a schematic diagram illustrating techniques for modifying the generalized types of airflows as these airflows pass over the rotorcraft blades during rotation.

FIG. 2 illustrates techniques, denoted generally at 200, for modifying the airflows 106, as carried forward from FIG. 1, as these airflows pass over the rotorcraft blades 102 during the rotation symbolized at 104. In scenarios in which the rotorcraft blades 102 do not include the cascaded arrays 108, the airflows 106 may separate undesirably from the surface of the rotorcraft blades 102, as represented generally by airflows 202. If the airflows 106 separate from the rotorcraft blades 102 as indicated at 202, this scenario may create lift force redistributed along the length of the rotorcraft blades 102, reducing the operational efficiency and lift capability provided by the rotorcraft blades 102. In extreme cases, the rotorcraft blades 102 may experience stall conditions due to undesirable airflow separation.

In the scenario shown in FIG. 2, rotorcraft blades 102 may be equipped with one or more of the cascaded arrays 108. These cascaded arrays 108 may be installed anywhere along the rotorcraft blades 102 as appropriate, with the location shown in FIG. 2 provided only as an example to facilitate this description.

Turning to the cascaded arrays 108 in more detail, these cascaded arrays 108 may selectively and actively modify the airflows 106 relative to the surfaces of the rotorcraft blades 102. In the example shown in FIG. 2, the cascaded arrays 108 may modify the airflows 106, bringing them closer to the surface 204 of the rotorcraft blades 102. The airflows 106 as modified by operation of the cascaded arrays 108 are shown at 206, as compared to separated airflows 202.

FIG. 2 illustrates the relationship between the separated airflows 202 and the modified airflows 206 somewhat arbitrarily and only for example, with the understanding that FIG. 2 is not drawn to scale. In implementations of this description, the relationship between the separated airflows 202 and the modified airflows 206 may vary from that shown in FIG. 2. However, modifying the airflows 206 to be closer to the rotorcraft blades 102 may increase the stability and efficiency of the rotorcraft blades 102 by altering the formation of high-pressure regions on the top surface 204 of the rotorcraft blades 102. In addition, the cascaded arrays 108 may contribute to increasing the lift rate of an airborne vehicle to which the rotorcraft blades 102 are affixed, while also reducing the prospect of a stall condition.

In some implementations of this description, the cascaded arrays 108 as shown and described herein may generate modified airflows 206 that approximate synthetic jets generated according to previous techniques for active airflow control over rotorcraft blades. To facilitate comparison, FIG. 2 provides a schematic view of implementations of such previous techniques, denoted generally at 208. An example rotorcraft blade 210 is represented in cross-section. This rotorcraft blade 210 may define an outlet 212 through which a synthetic jet 214 passes. In the previous techniques represented at 208, mechanisms inside the rotorcraft blade 210 may generate the synthetic jet 214 as part of efforts to actively control airflow over the rotorcraft blade 210. However, in some implementations, the airflows 206 as modified using the cascaded arrays 108 may achieve aerodynamic effects similar to those achieved by the synthetic jets 214.

Figure 3:
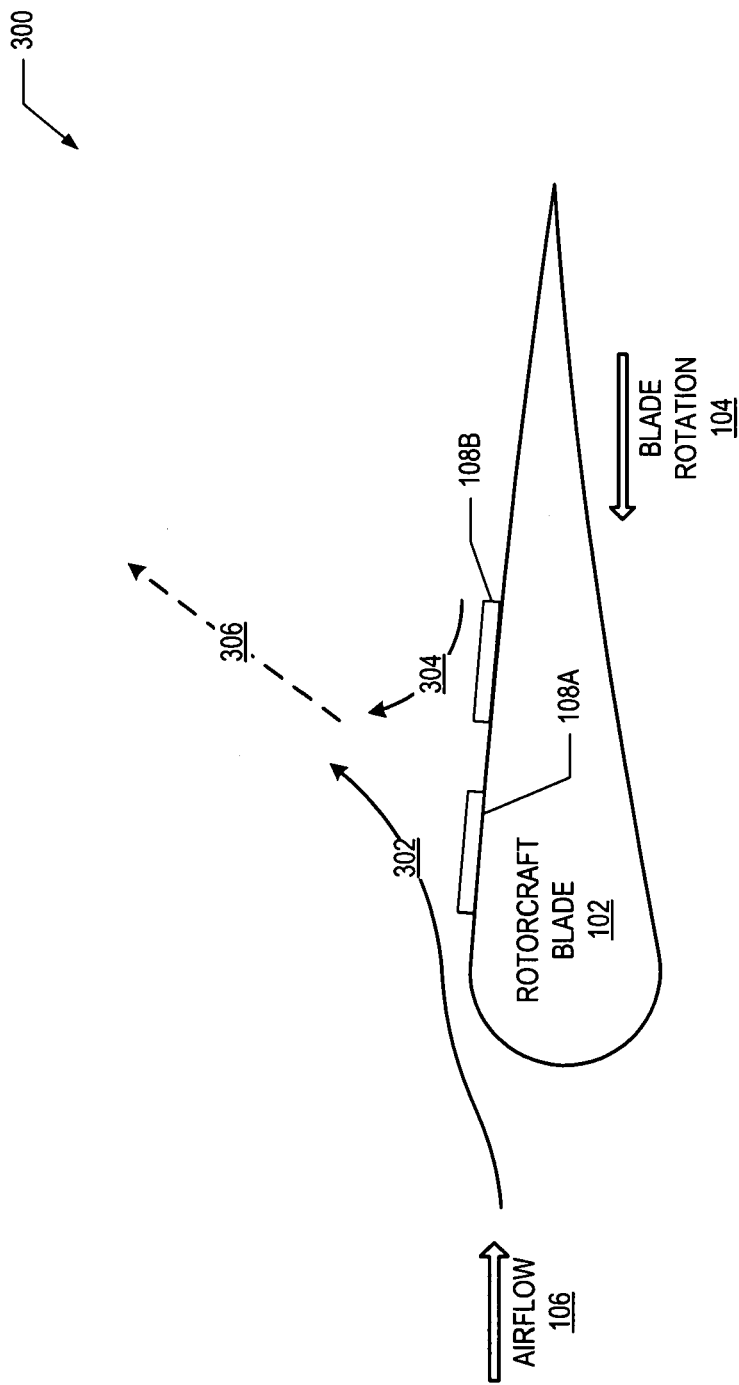
FIG. 3 is a schematic diagram illustrating additional examples of modifying two or more airflows into a combined airflow.

FIG. 3 illustrates additional examples, denoted generally at 300, for modifying the airflows 106, as carried forward from FIG. 1, as these airflows pass over the rotorcraft blades 102 during the rotation symbolized at 104.

Referring to FIG. 3 in more detail, the rotorcraft blade 102 shown in FIG. 3 may include two cascaded arrays 108*a* and 108*b*. More specifically, FIG. 3 provides examples of controlling the directions of moving airflows. As shown, the cascaded array 108*a* may redirect the airflows 106, resulting in a modified airflow 302. Meanwhile, the cascaded array 108*b* may redirect other airflows, resulting in another modified airflow 304. The modified airflows 302 and 304 may combine to form a composite or combined modified airflow 306, to reach the similar effect as 214.

As appreciated from the foregoing description, the operation of the cascaded arrays 108*a* and 108*b* may be controlled or modulated, to modify the speed and/or direction of the modified air flows 302 and 304. In turn, the speed and direction of the composite modified airflow 306 may vary in response to modifications of the constituent airflows 302 and 304. In implementations that provide the foregoing functions, operation of the cascaded arrays 108*a* and 108*b* may be coordinated with one another, to coordinate generation and movement of the modified airflows 302 and 304. More specifically, the control circuits described in more detail below may operate in response to customized waveforms that achieve the foregoing coordination.

In the examples shown in FIGS. 2 and 3, the cascaded arrays 108 may be affixed to the surfaces (e.g., 204) of the rotorcraft blades 102, without otherwise affecting the structure of the rotorcraft blades 102. However, as now discussed with FIG. 4, some implementations of this description may involve modifying the rotorcraft blades 102 to receive the cascaded arrays 108.

Figure 4:
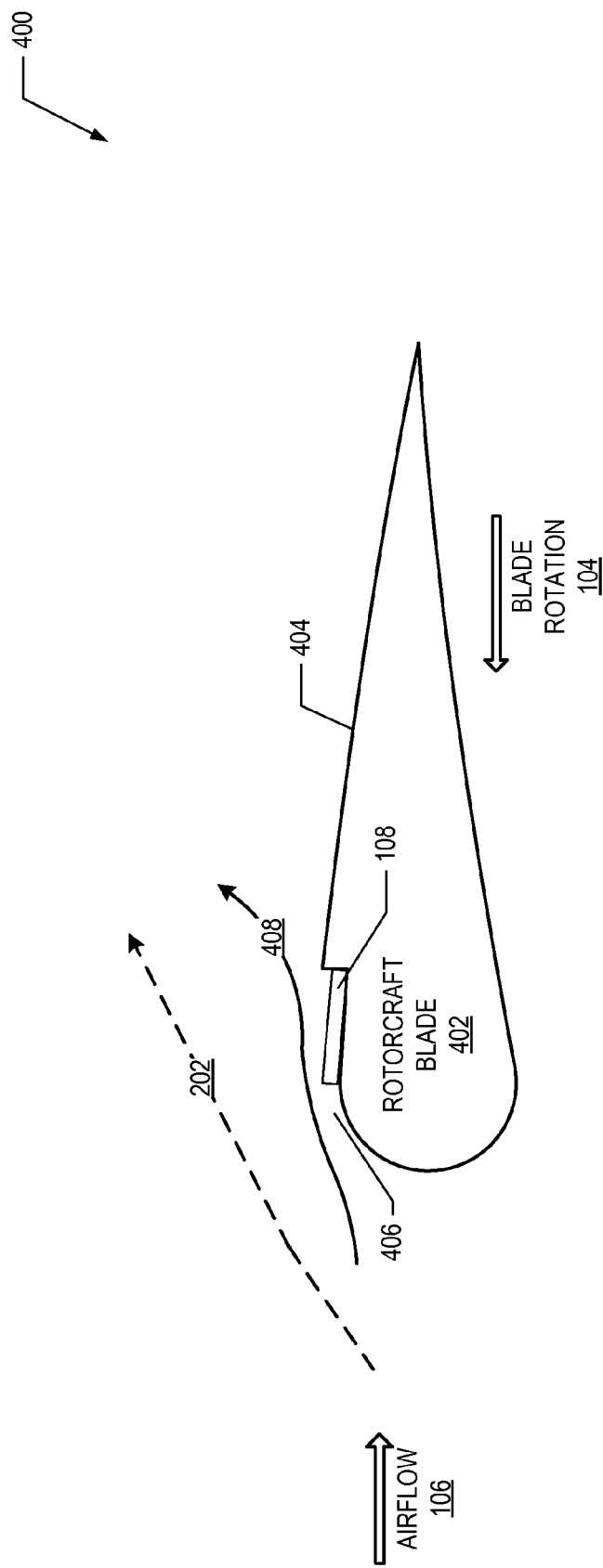
FIG. 4 is a schematic diagram illustrating scenarios in which the plasma actuating cascade arrays are installed in recesses defined by the rotorcraft blades.

FIG. 4 illustrates techniques, denoted generally at 400, for modifying the airflows 106, as carried forward from FIG. 1, as these airflows pass over a rotorcraft blade 402 during the rotation symbolized at 104. For comparison, FIG. 4 carries forward the unmodified airflows 202, which may be separated from the surface 404 of the rotorcraft blade 402.

The rotorcraft blades 402 as shown in FIG. 4 may define one or more recesses 406, suitable for receiving any number of the cascaded arrays 108. Although FIG. 4 is not drawn to scale, it is appreciated that the depth of the recesses 406 may vary to accommodate the cascaded arrays 108. In some implementations of the rotorcraft blades 402, the top surfaces of the cascaded arrays 108 may be flush with the rotor blade surfaces 402. In other implementations, the top surfaces of the cascaded arrays 108 may be above or below the rotor blade surfaces 402.

In general, the cascaded arrays 108 may operate to modify the airflows 106, redirecting the airflows 106 closer to the surface 404 of the rotorcraft blade 402, as represented generally at 408. As described previously, the relationship between the unmodified airflows 202 and the modified airflows 408 is not drawn to scale, and is understood as illustrative rather than limiting.

Having illustrated and described how the cascaded arrays 108 may selectively modify the airflows 106 along the rotorcraft blades 102, the discussion now turns to a more detailed description of the cascaded arrays 108. This description now proceeds with FIG. 5.

Figure 5:
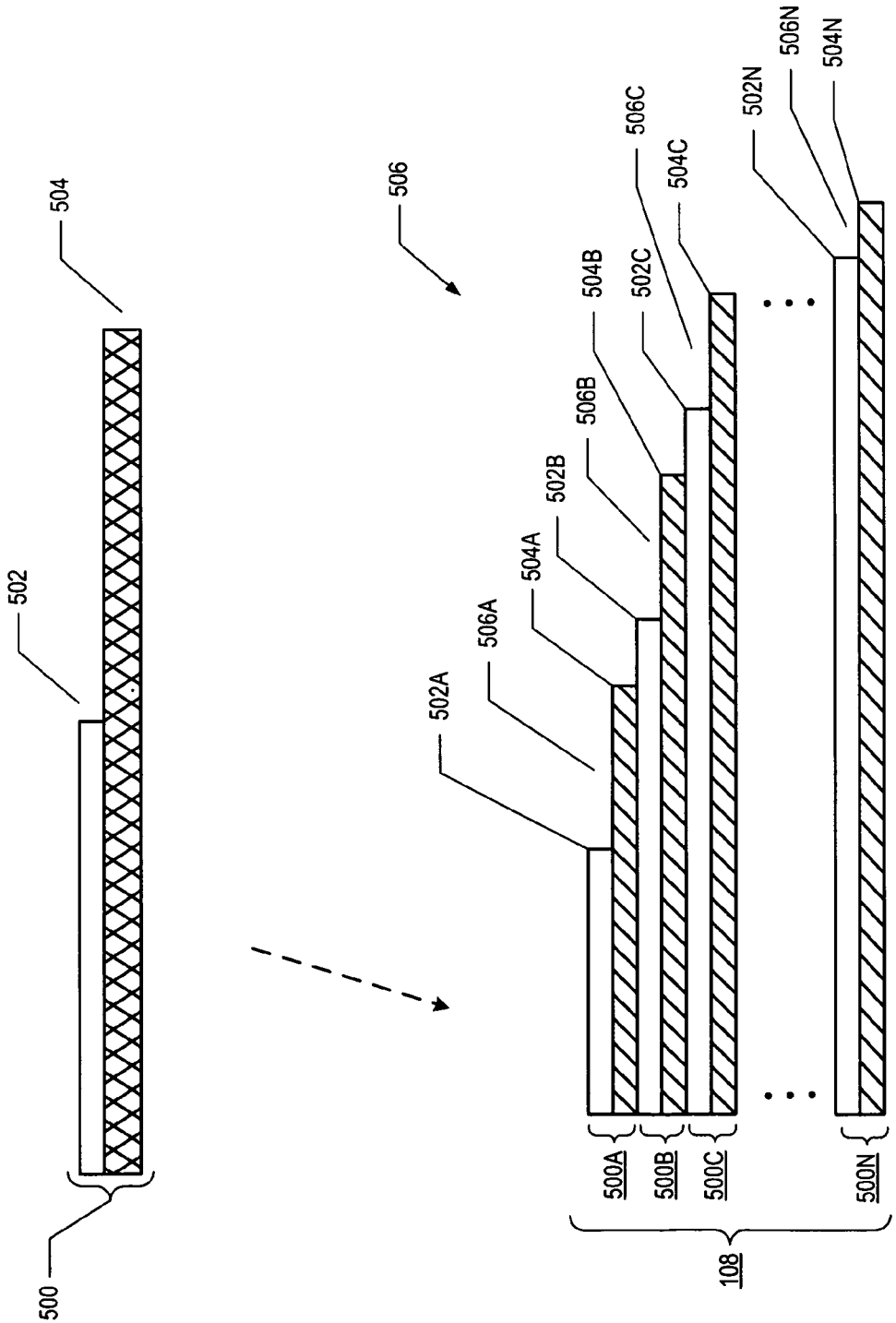
FIG. 5 is a diagram that illustrates electrodes and dielectrics that may form the plasma actuating cascade arrays.

FIG. 5 illustrates a unit, denoted generally at 500, which may be stacked in a form of a cascade array to generate and move plasma clusters. In turn, the plasma clusters may modify the airflows as shown generally in FIGS. 2-4. The cascaded arrays 108 as shown in the previous Figures may include any number of these plasma generation units 500.

Turning to the plasma generation units 500 in more detail, these units may include any number of electrodes 502 and any number of dialectics 504. In the examples shown in FIG. 5, individual electrodes 502 and dialectics 504 may be elongated to any convenient length, and may be constructed to have any suitable thickness.

FIG. 5 also illustrates constructions, denoted generally at 506, that may include any number of the plasma generation units 500A-500N (collectively, plasma generation units 500), with a given cascaded array 108 including any number of the plasma generation units 500. As shown in FIG. 5, the plasma generation unit 500A may include the electrode 502A and the dielectric 504A. Likewise, the plasma generation unit 500B may include the electrode 502B and the dielectric 504B, the plasma generation unit 500C may include the electrode 502C and the dielectric 504C, and the plasma generation unit 500N may include the electrode 502N and the dielectric 504N. While FIG. 5 illustrates four examples of the units 500A-500N, it is noted that implementations of this description may include any number of the units 500.

Turning to FIG. 5 in more detail, the cascaded array 108 may be constructed so that the dielectric 504A is sandwiched between the electrodes 502A and 502B, the dielectric 504B is sandwiched between the electrodes 502B and 502C, and so on. In the examples shown in FIG. 5, the dielectric 504A is slightly longer than the electrode 502A, the electrode 502B is slightly longer than the dielectric 504A, and so on.

As shown and discussed further below, the cascaded arrays 108 may also be constructed to have an angled, curved, bent, or non-planar configuration. In these latter configurations, the electrodes and dielectrics may be staggered relative to one another, resulting in a generally stair-stepped arrangement. In this arrangement, a given electrode may extend somewhat beyond the dielectric immediately above it in the array, the dialectic immediately below the given electrode may extend beyond the electrode, and so on.

In the configuration shown in FIG. 5, the cascaded array 108 may define a plurality of areas 506A, 506B, 506C, and 506N (collectively, areas 506) suitable for generating plasma clusters. These plasma clusters are illustrated and described in more detail below. However, for the purposes of describing FIG. 5, the area 506A may be generally defined by how much the dielectric 504A and the electrode 502B extend past the end of the electrode 502A. Similarly, the area 506B may be defined generally by how much the dielectric 504B and the electrode 502C extend past the end of the electrode 502B, and the area 506C may be defined by how much the dielectric 504C and a next electrode (not shown) extend past the electrode 502C. Finally, the area 506N may be defined by how much a dielectric 504N extends past the electrode 502N. It is appreciated from this description of FIG. 5 that the construction of the array 104 may be extended to any level of cascade.

Figure 6:
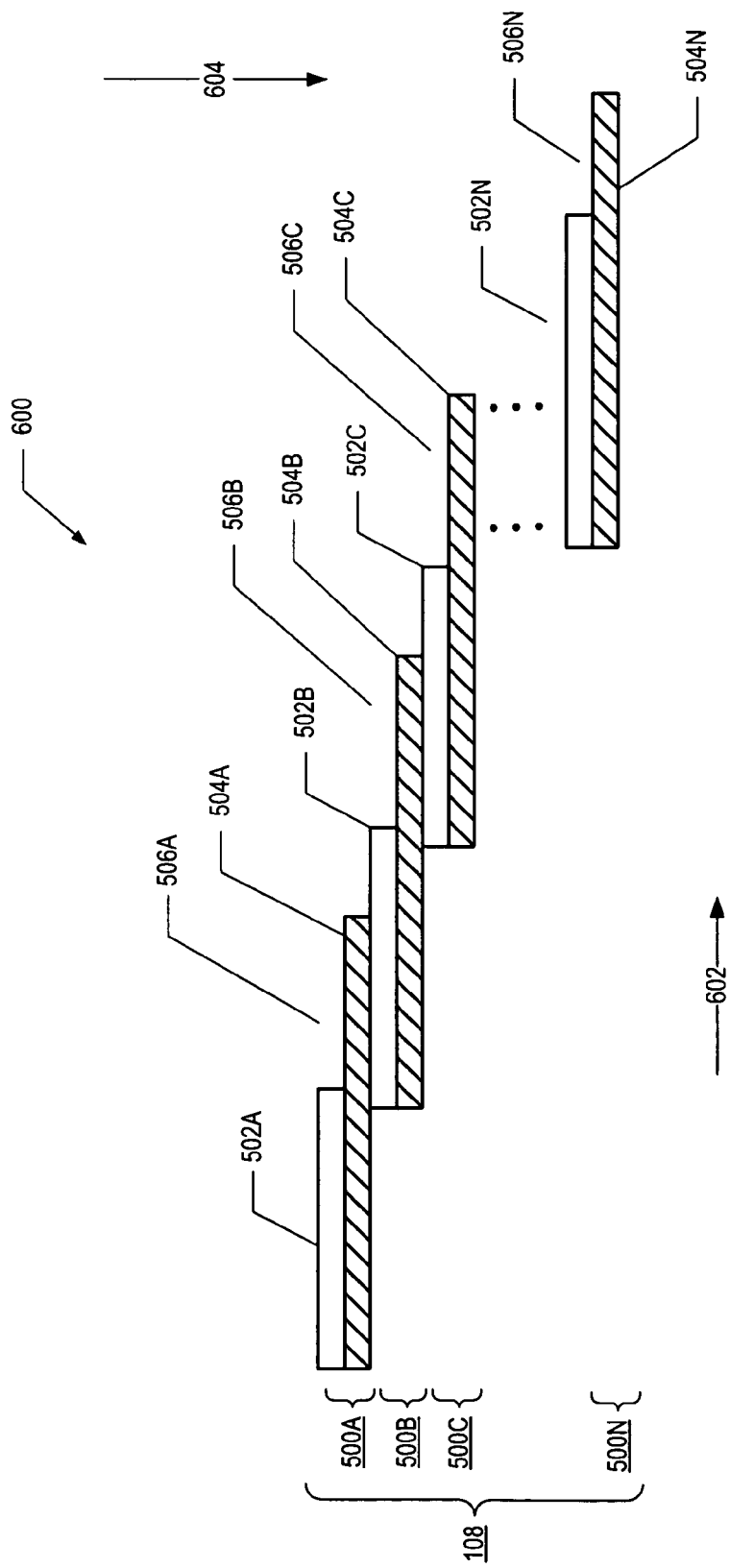
FIG. 6 is a diagram illustrating additional constructions of the plasma actuating cascade arrays, in which the dielectrics are generally the same length.

FIG. 6 illustrates additional constructions, denoted generally at 600, of the cascaded array 108. More specifically, the cascaded array 108 may include any number of units 500A-500N, which in turn may include respective pairs of electrodes 502A-502N and dielectrics 504A-504N that are cascaded into arrays for generating and moving plasma. The dielectrics 504A, 504B, 504C, and 504N may also be shortened, as well as the electrodes 502B, 502C, and 502N. These shortened electrodes and dielectrics may increase the physical flexibility of the overall cascaded array.

Comparing the cascaded arrays 108 as shown in FIGS. 5 and 6, the dielectrics 504 as shown in FIG. 6 are approximately the same lengths. However, the dielectrics 504 as shown in FIG. 5 are various different lengths, depending on where they are located within the cascaded array 108. Referring to both FIGS. 5 and 6, the cascaded arrays 108 may be disbanded or cascaded in a first direction (e.g., horizontally, as represented by the arrow 602), and may be disbanded or cascaded in another direction (e.g., vertically, as represented by the arrow 604). The cascading in the direction represented by the arrow 602 may depend on how much different units 500A-500N are staggered relative to one another. The cascading in the direction represented by the arrow 604 may depend on the thicknesses of the electrodes 502 and the dielectrics 504.

Figure 7:
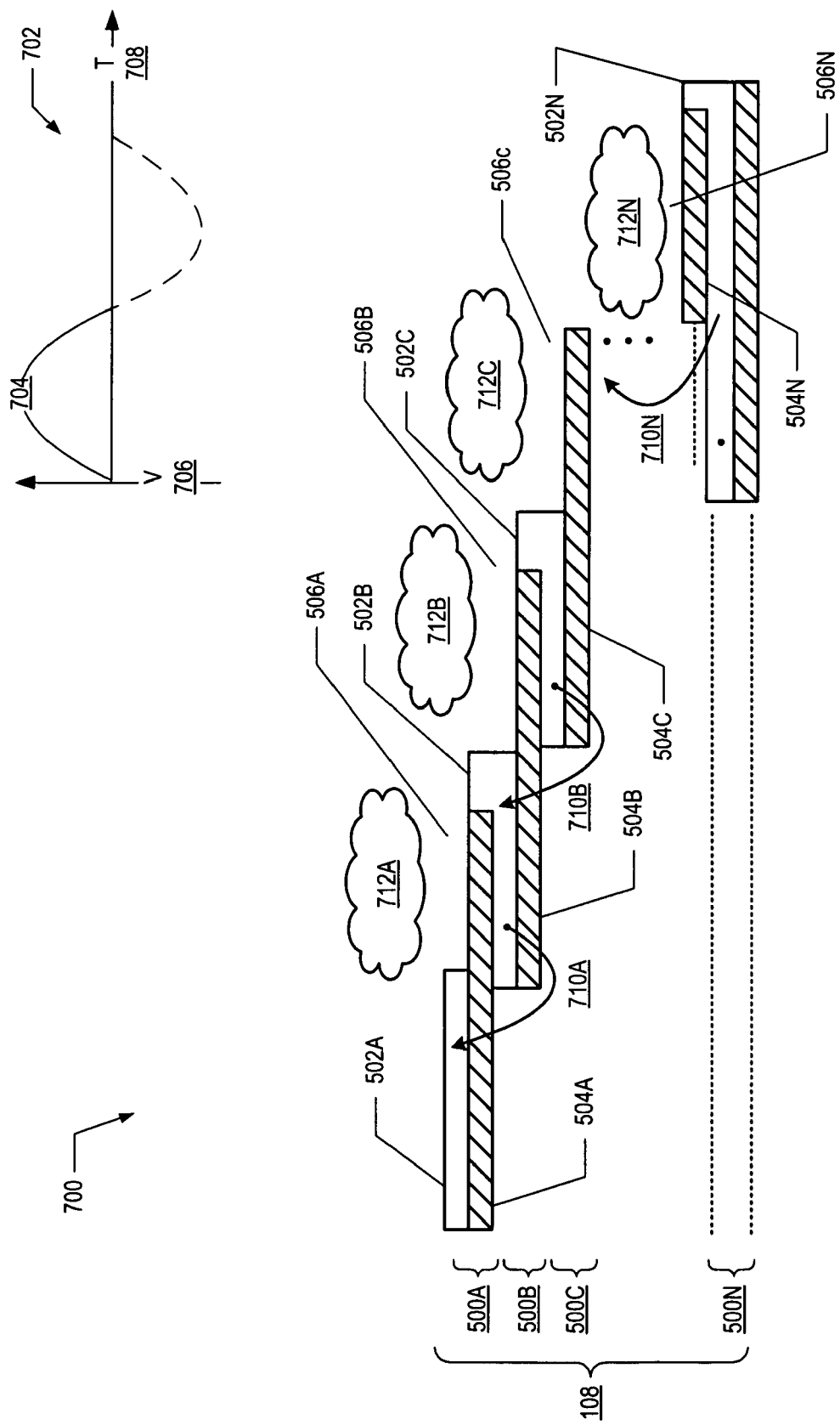
FIG. 7 is a diagram illustrating scenarios in which a given plasma actuating cascaded array may generate plasma clusters at different areas along the array.

FIG. 7 illustrates scenarios, denoted generally at 700, by which a given cascaded array 108 may operate the different units 500A-500N to generate plasma clusters at the different areas 506A-506N. More specifically, the cascaded array 108 may operate in response to an input waveform, denoted generally at 702. Referring to the input waveform 702, input power 704 (expressed without limitation as input voltage) may have shape, amplitude and/or polarity 706 that varies over time 708. Put differently, the input power 704 may alternate periodically over time.

As detailed further below, the various electrodes 502A-502N may be coupled to receive the input voltage 704. However, the details of these connections are omitted from FIG. 7 for convenience of description. Turning to FIG. 7 in more detail, the electrodes 502A and 502B may define a voltage 710A relative to one another, across the dielectric 504A. In response to a first phase (or half) of a cycle of this voltage, gas or air proximate the area 506A may ionize to form a plasma cluster 712A.

In a similar manner, the electrodes 502B and 502C may define a voltage 710B across the dielectric 504B, causing generation of the plasma cluster 712B. Likewise, the electrodes 502N and the previous electrode 502(N−1) (not shown) may define a voltage 710N across the dielectric 504N, causing generation of the plasma cluster 712N.

The electrodes 502B, 502C, and 502N may be L-shaped in configuration, with a thicker portion arranged as shown in FIG. 7. The thicker portions of the electrodes 502B, 502C, and 502N may place a portion of the electrodes generally flush with the dielectrics immediately above the electrodes. This configuration may promote the generation of the plasma clusters 712 in the areas 506A-506N.

Figure 8:
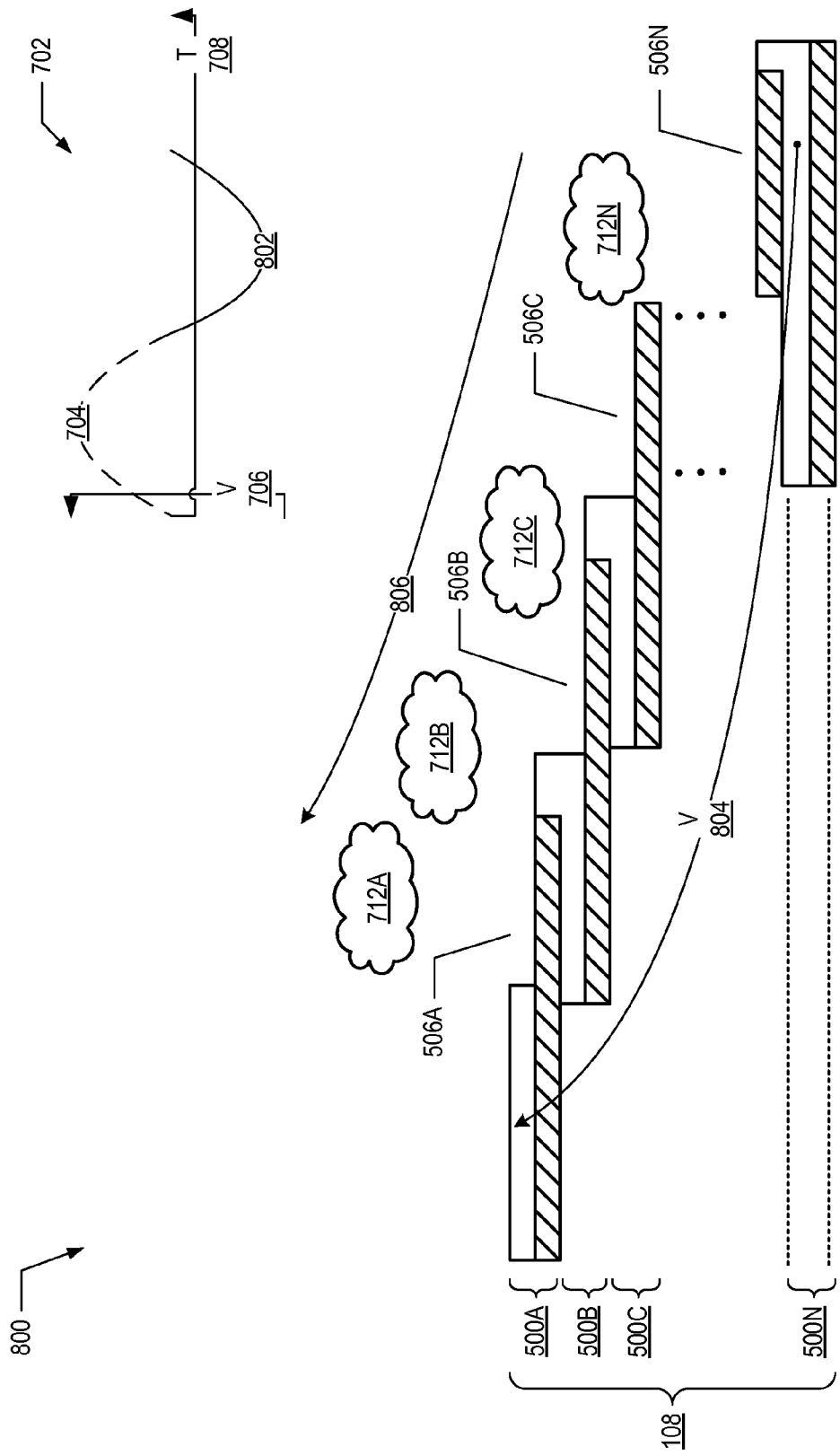
FIG. 8 is a diagram illustrating scenarios in which the plasma clusters are moved in response to an input waveform.

FIG. 8 illustrates scenarios, denoted generally at 800, by which the plasma clusters 712A-712N that were generated in FIG. 7 are moved in response to an alternative phase 802 of a cycle of the input waveform 702. For example, assuming an input waveform 702 that represents an alternating-current (AC) power source, the scenario shown in FIG. 7 may occur during one phase 704 of the AC power source, while the scenario shown in FIG. 8 may occur during a subsequent phase 802 of the power source.

It is noted that the examples of the input waveforms 702 are provided only for ease of illustration, but not to limit possible implementations. More specifically, it is noted that the input waveforms may take other forms, without departing from the scope and spirit of this description. Examples of such other forms may include, but are not limited to: saw-toothed waveforms, triangular waveforms, waveforms having non-uniform or non-standard duty cycles, and other waveforms not specifically illustrated herein. In general, different waveforms may be chosen or customized as suitable for the circumstances of particular implementation scenarios, so as to achieve particular predefined plasma generating and displacement effects.

FIG. 8 carries forward the example cascaded array 108, which may include the units 500A-500N for generating the plasma clusters 712A-712N in the vicinity of the respective areas 506A-506N. Taken as a whole, the units 500A-500N may be subjected to a cumulative voltage 804 during the second phase 802 of the cycle 702, which was shown in FIG. 7. As the input waveform 702 enters the phase 802, the voltage applied to the units 500A-500N may cause the plasma clusters to transition. Similarly, the same effect may qualitatively be achieved by applying the phase 802 between the adjusted pairs of electrodes 502A and 502B, generating voltage 710A (FIG. 7) of the opposite polarity; between the adjusted pairs 502B and 502C, generating voltage 710B (FIG. 7) of the opposite polarity, and so on. Likewise, the phase 802 may be applied between the electrodes 504N and 504(N−1) (not shown) generating voltage 710N (FIG. 7) of the opposite polarity. These reverse steps may be done simultaneously or subsequently.

Assuming that the cascaded array 108 is installed on the surface of an airfoil (e.g., the rotorcraft blades 102), the movement of the plasma clusters 712A-712N may either selectively or collectively induce air bulk movements along the surface of the airfoil, in the direction indicated by the arrow 806. In this manner, the voltage transitions occurring through the units 500 may induce air movements along the airfoil, thereby producing the modified airflow (e.g., 206 in FIG. 2, and so on).

Generalizing from the examples shown in FIGS. 7 and 8, the waveform 702 has applied to the units 500 in the cascaded array 108 may be adjusted, so as to induce modify airflows in a direction by generating and moving plasma clusters as appropriate. In general, the different units 500 may be controlled individually, to induce movement of the plasma clusters generated at the different units. In addition, the different units 500 may be operated to modify airflows to move at specified speeds or velocities.

Figure 9:
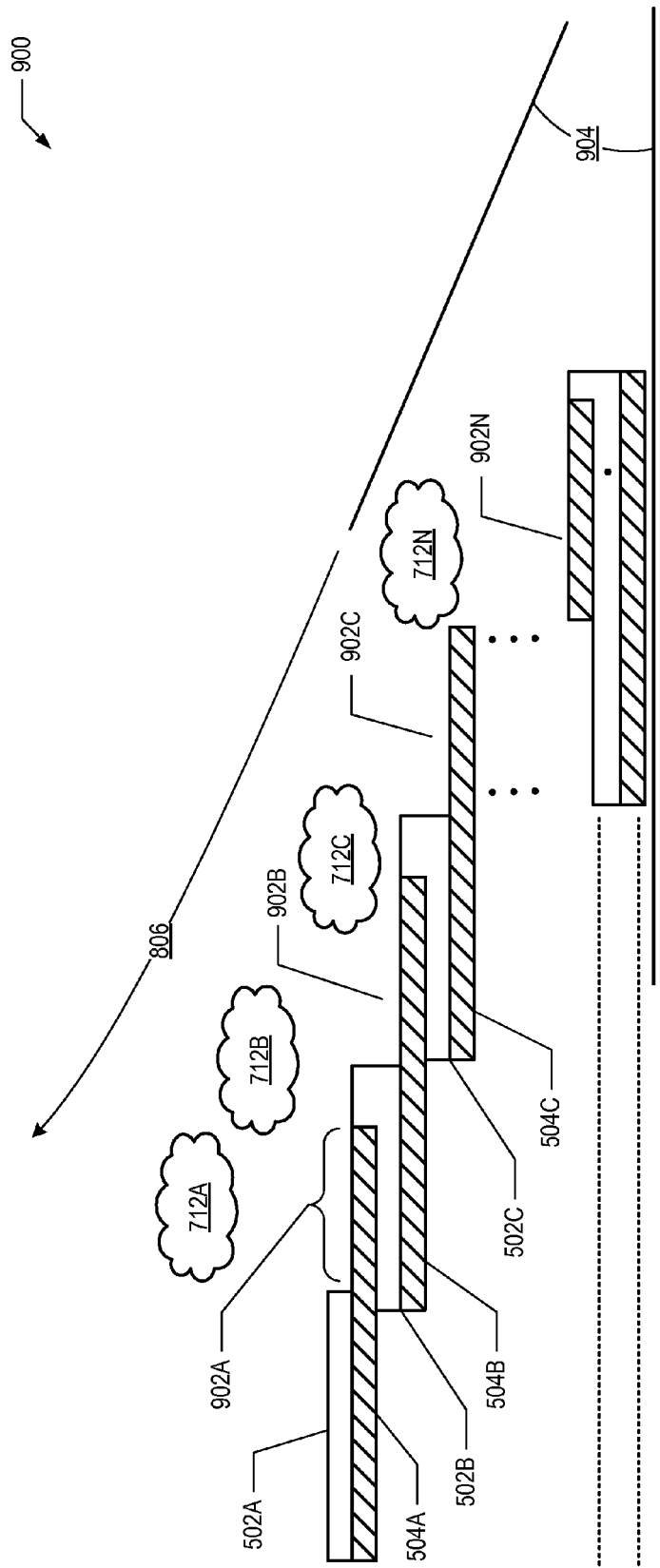
FIG. 9 is a diagram illustrating angled configurations of the plasma actuating cascade arrays.

FIG. 9 illustrates angled configurations, denoted generally at 900, of the cascaded arrays 108. As shown in FIG. 9, a portion 902A of the dielectric 504A may be exposed between the electrodes 502A and 502B. Likewise, a portion 902B of the dielectric 504B may be exposed between the electrodes 502B and 502C, and so on through the cascaded arrays 108. In the examples shown in FIG. 9, the lengths of these exposed portions 902A, 902B, 902C, and 902N (collectively, exposed portions 902) may be approximately equal throughout the entirety of a given cascaded array 108.

The configurations 900 shown in FIG. 9 may result in the cascaded arrays 108 having an overall angled profile, as represented generally at 904. Accordingly, the plasma clusters 712A-712N may induce air movement 806 generally along the angled profile 904.

Figure 10:
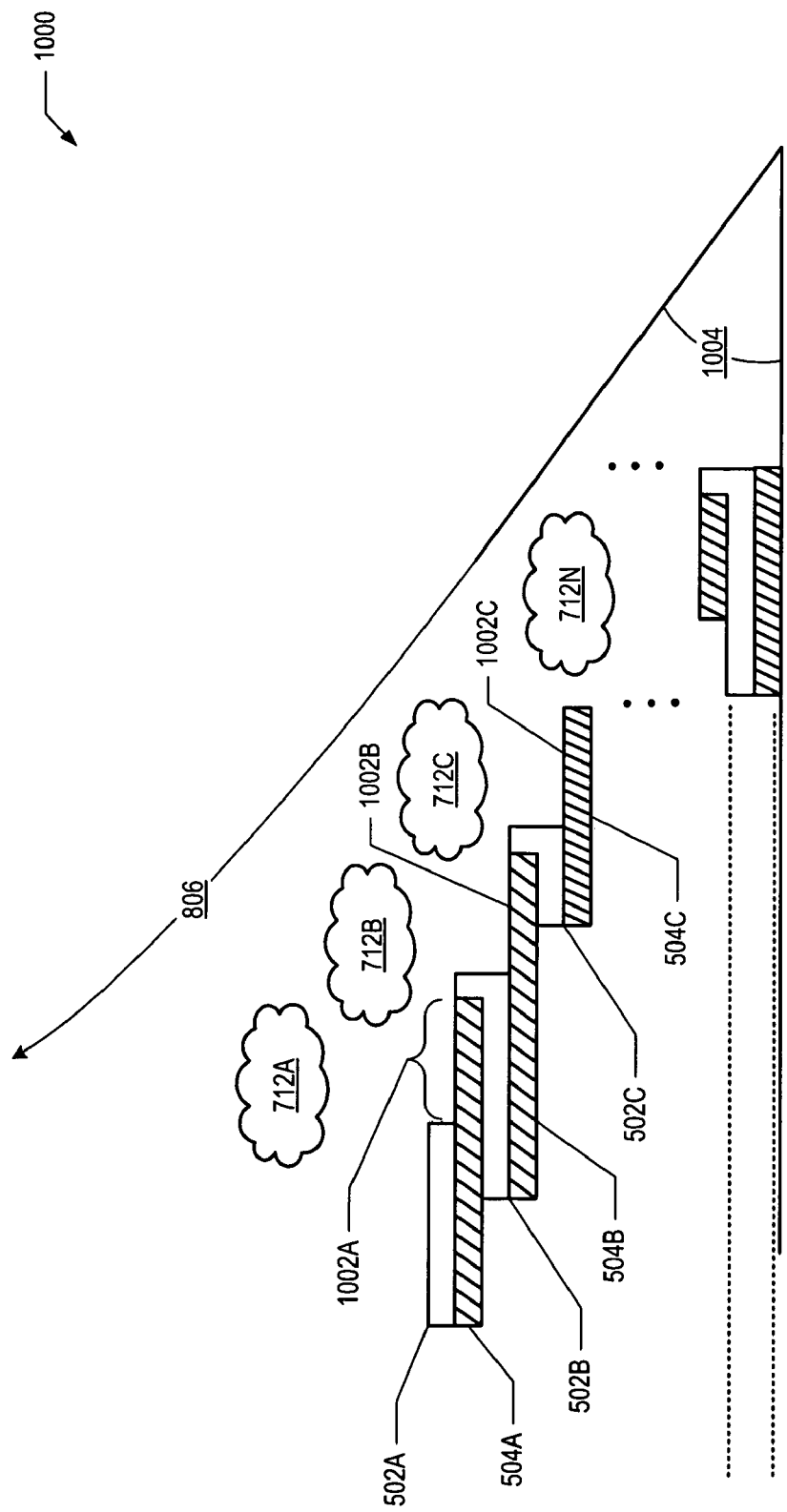
FIG. 10 illustrates additional examples of the angled configurations of the plasma actuating cascade arrays.

FIG. 10 illustrates additional examples of angled configurations, denoted generally at 1000, of the cascaded arrays 108. As shown in FIG. 10, a portion 1002A of the dielectric 504A may be exposed between the electrodes 502A and 502B. Likewise, a portion 1002B of the dielectric 504B may be exposed between the electrodes 502B and 502C, and so on through the cascaded arrays 108. In the examples shown in FIG. 10, the lengths of these exposed portions 1002A, 1002B, 1002C, and 1002N (collectively, exposed portions 1002) may be approximately equal throughout the entirety of a given cascaded array 108.

Although FIGS. 9 and 10 are not drawn to scale, FIG. 10 illustrates scenarios in which the exposed portions 1002 are shorter than the corresponding exposed portions 902 shown in FIG. 9. When the dielectrics and electrodes are assembled as shown in FIG. 10, the angled configurations 1000 as a whole may have an angled profile, as represented at 1004. However, because of the shorter lengths of the exposed dielectric portions 1002, the angled profile 1004 may be greater than the angled profile 904 shown in FIG. 9. Accordingly, the plasma clusters 712A-712N may induce air movements 806 along the steeper angled profile 1004, relative to the angled profile 904 shown in FIG. 9.

Having described the configurations shown in FIGS. 1-10, any number of the configurations denoted at 900 and/or 1000 may be installed anywhere along the surfaces 204 of the rotorcraft blades. More specifically, the configurations 900 and/or 1000 may be located on the surfaces 204 to control airflows along these surfaces. The configurations 900 and/or 1000 may control these airflows to achieve any number of efficiency goals for a given rotorcraft, with these goals including, but not limited to, reducing drag forces, increasing stability and lift characteristics of the rotorcraft, and the like.

Figure 11:
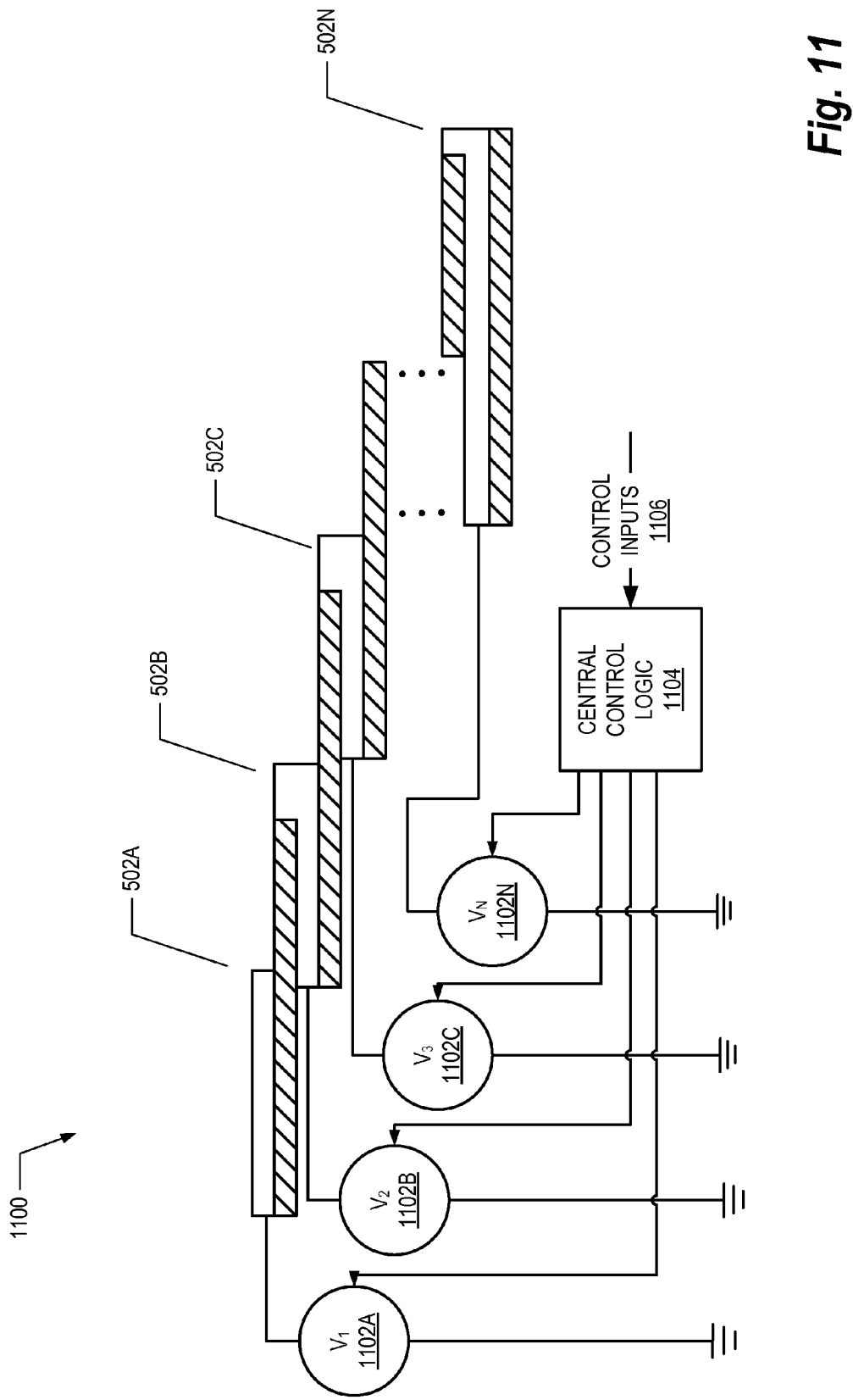
FIG. 11 is a block diagram illustrating examples of power supply systems for supplying voltage to the electrodes within the cascade arrays.

FIG. 11 illustrates examples of power supply systems, denoted generally at 1100, for supplying voltage to the electrodes 502A-502N within the cascaded array. In the scenario shown in FIG. 11, the individual electrodes 502A-502N are associated with respective discrete or individual power supplies 1102A-1102N (collectively, individual power supplies 1102). These individual power supplies 1102 may operate to generate waveforms (e.g., 702 shown in FIGS. 7 and 8), and provide them as input to the respective electrodes 502A-502N. As such, these individual power supplies 1102 may provide AC custom waveforms to the electrodes 502A-502N.

In some implementations, the different power supplies 1102A-1102N may represent individual, separately-controllable power supplies. In other implementations, the different power supplies 1102A-1102N may represent controllable portions of a single, integrated general power source.

The power supply systems 1100 may include central control logic 1104 that individually manages the operation of the power supplies 1102A-1102N, in response to signals represented by the control inputs 1106. Non-limiting examples of the control inputs 1106 are now described in further detail with FIG. 12.

Figure 12:
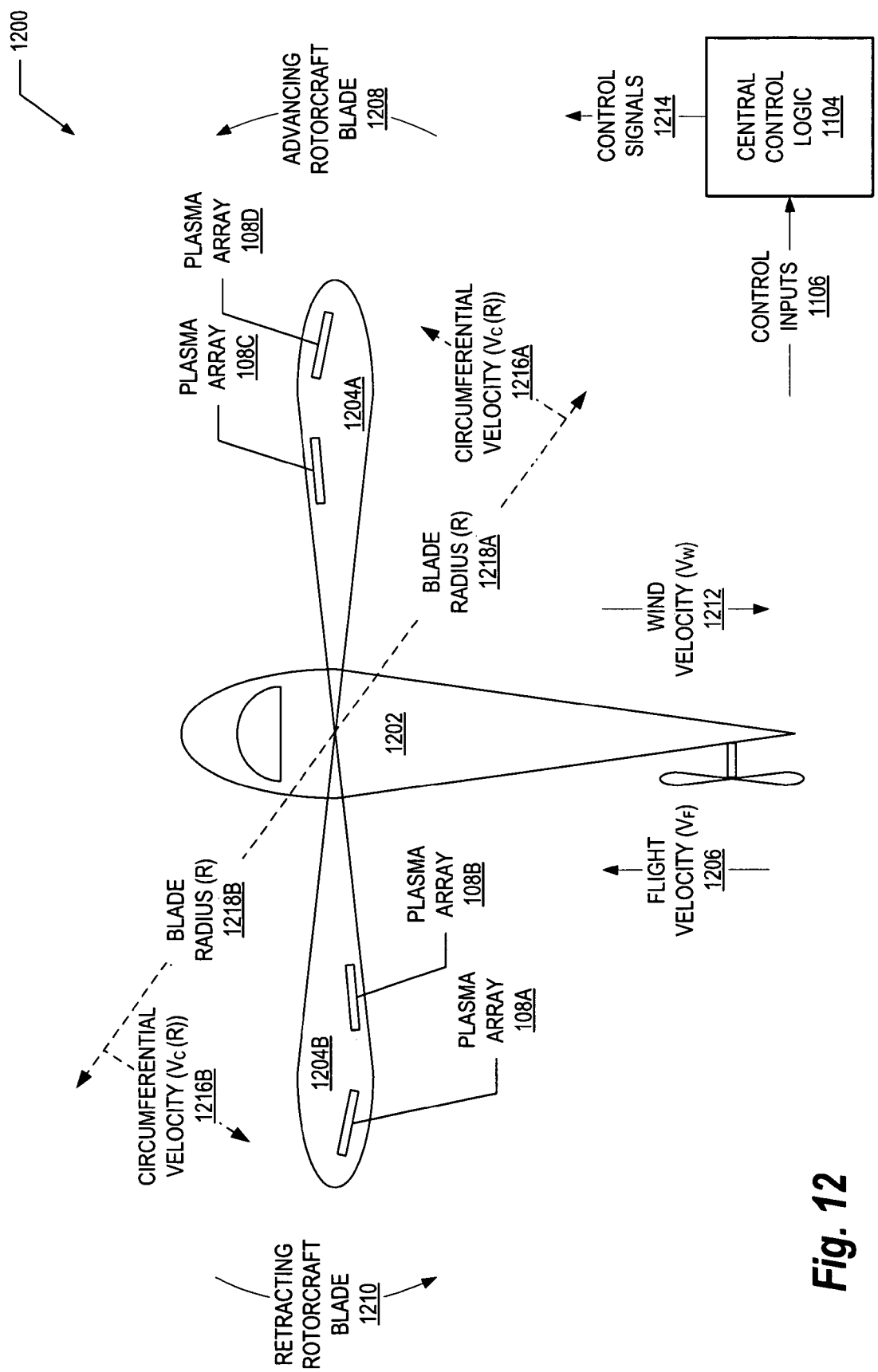
FIG. 12 is a block diagram illustrating various operating parameters, shown in schematic form to facilitate this description.

FIG. 12 illustrates various operating parameters, denoted generally at 1200, shown in schematic form to facilitate this description. An illustrative rotorcraft 1202 may include rotating blades 1204a and 1204b (collectively, rotating blades 1204), although implementations of this description may be practiced with any number of rotating blades 1204. In the examples shown in FIG. 12, the blades 1204 may rotate in a counter-clockwise direction, with the overall rotorcraft 1202 moving at the velocity ($V_f$) indicated by the arrow 1206. In these examples, the rotorcraft blade 1204a may be characterized as advancing, relative to the velocity ($V_f$) of the rotorcraft 1202, as represented generally at 1208. The rotorcraft blade 1204b may be characterized as retracting, relative to the velocity ($V_f$), as represented generally at 1210.

Generalizing the foregoing examples, in a scenario in which the blades 1204 are attached to a rotorcraft 1202, one or more of the blades may be generally moving forward or advancing at a given time, relative to the velocity ($V_f$) of the overall rotorcraft. At that same given time, one or more of the blades may be generally retracting. When the overall rotorcraft 1202 is moving at the velocity ($V_f$), the rotorcraft 1202 may experience wind loads ($V_w$), represented generally by the arrow 1212. Accordingly, when the rotorcraft 1202 is moving, the advancing rotorcraft blade 1204a and the retracting rotorcraft blade 1204b may experience different mechanical loads. However, when the rotorcraft 1202 is stationary (e.g., hovering), the rotorcraft blades 1204a and 1204b may experience the same general loads.

FIG. 12 carries forward representative plasma arrays 108a-108d (collectively, plasma arrays 108) from previous Figures, installed on the rotating blades 1204a and 1204b. The number, orientation, and locations of the plasma arrays 108 as shown in FIG. 12 are illustrative only, and may vary in different implementations.

As described previously, the plasma arrays 108a-108d may be driven with customized waveforms (e.g., 702 in FIGS. 7 and 8). In scenarios in which the rotorcraft 1202 is moving rather than stationary, the rotorcraft blades 1204a and 1204b are loaded differently. Therefore, the representative plasma arrays 108c and 108d on the advancing rotorcraft blade 1204a may be driven with waveforms that are customized in view of the load profiles experienced by that rotorcraft blade. In addition, the representative plasma arrays 108a and 108b on the retracting rotorcraft blade 1204b may be driven with waveforms that are customized in view of the load profiles experienced by that rotorcraft blade. In these scenarios, the waveforms driving the plasma arrays 108a and 108b may differ from the waveforms driving the plasma arrays 108c and 108d.

The plasma arrays 108 may be driven by central control logic 1104, carried forward from FIG. 11. The central control logic 1104 may receive a set of input signals, represented generally by the control inputs 1106, which are also carried forward from FIG. 11. FIG. 12 provides examples of control signals 1214, which drive the customized electrical waveforms to the various plasma arrays 108a-108d.

Figure 13:
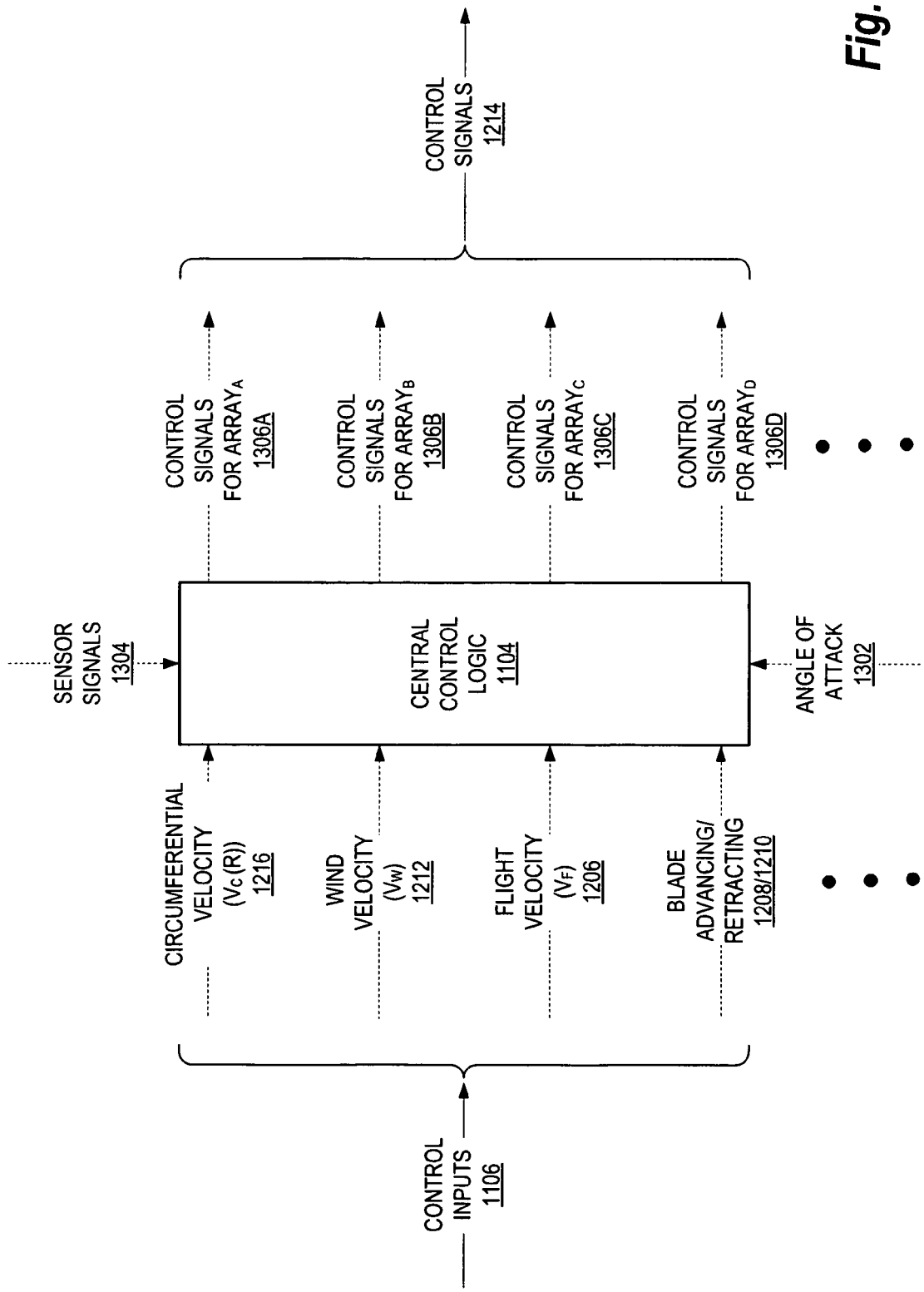
FIG. 13 is a combined block and data flow diagram illustrating processing associated with central control logic for driving control signals to the cascade arrays.
Figure 14:
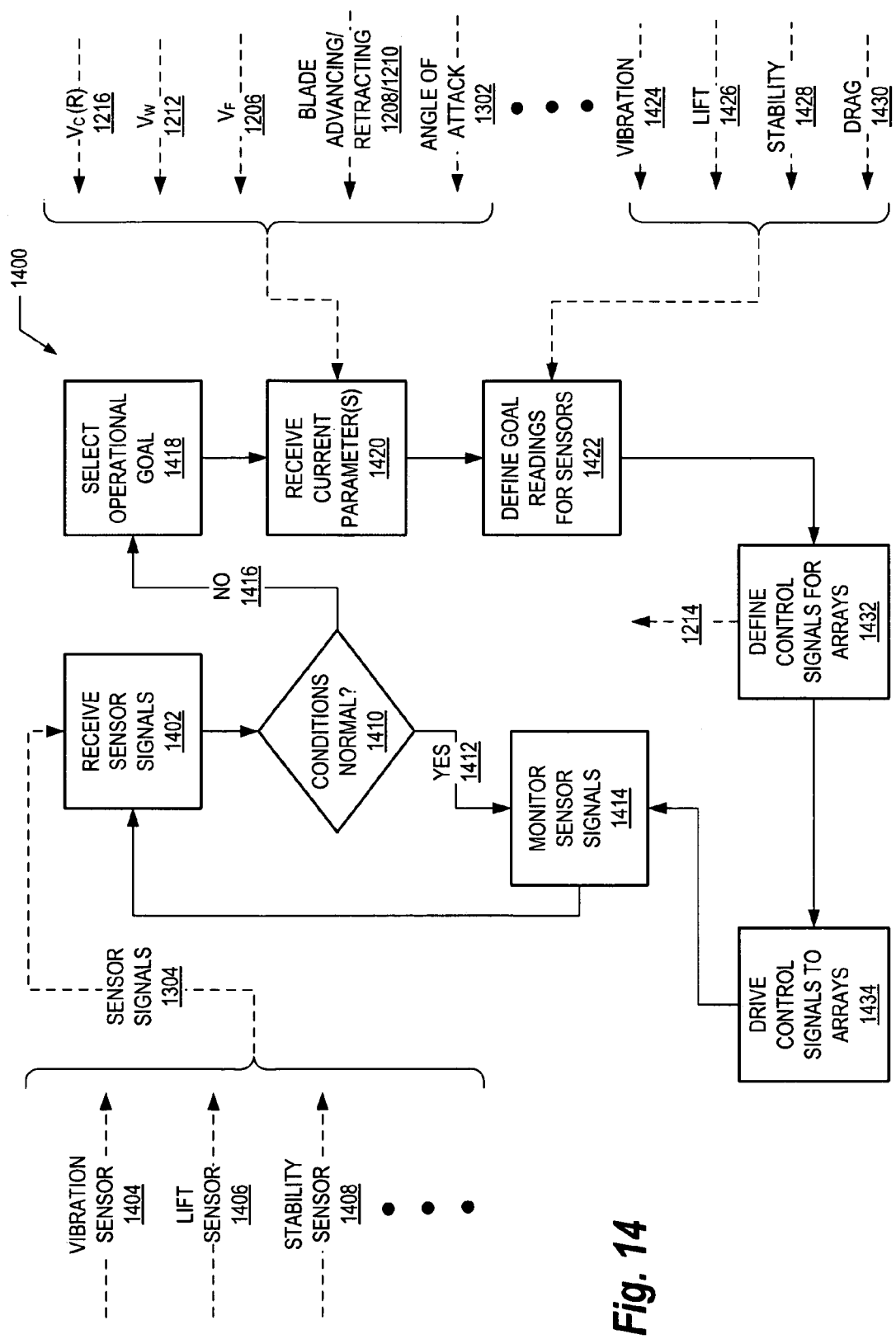
FIG. 14 is a flow chart illustrating processes that the central control logic may perform in calculating the control signals for the various plasma arrays.

Operation of the central control logic 1104 is described further with FIGS. 13 and 14. However, in overview, the control inputs 1106 may include representations of the flight velocity ($V_f$) of the rotorcraft 1202 and the wind velocity ($V_W$) experienced by the rotorcraft 1202. The control inputs 1106 associated with driving the plasma arrays 108a-108d may also indicate whether the rotorcraft blades 1204, to which plasma arrays are attached, are advancing or retracting at a given time.

The control inputs 1106 may also include representations of different circumferential velocities ($V_a$) that the various plasma arrays 108a-108d experience as the rotorcraft blades 1204a and 1204b rotate. The circumferential velocities ($V_a$) experienced by different plasma arrays 108a-108d are represented generally at 1216a and 1216b (collectively, circumferential velocities 1216). In addition, the circumferential velocity ($V_a$) of a given plasma array 108 may vary as a function of the position of the plasma array 108 along the rotorcraft blades 1204. FIG. 12 generally represents at 1218a and 1218b the respective radii (r) of the rotorcraft blades 1204a and 1204b. Accordingly, the notation ($V_c(r)$) indicates that the circumferential velocity of a given plasma array 108 may vary, according to the location of the given plasma array 108 along the radius of the rotorcraft blade 1204.

FIG. 13 illustrates processing, denoted generally at 1300, associated with the central control logic 1104. In general, the central control logic 1104 may receive control inputs 1106 corresponding to any number of different plasma arrays 108, and may generate control signals 1214 that represent electrical waveforms customized for those different plasma arrays 108. As described previously, the control inputs 1106 may include at least signals representing the circumferential velocity ($V_c$) 1216 associated with different given plasma arrays 108, the wind velocity ($V_w$) 1212 experienced by the rotorcraft to which the plasma arrays 108 are attached, and the flight velocity ($V_f$) 1206 associated with the rotorcraft. The control inputs 1106 associated with different plasma arrays 108 may also include signals 1208 and 1210 indicating whether, at a given time, the rotorcraft blades to which the plasma arrays are attached are advancing or retracting.

In addition to the foregoing control inputs 1106, the central control logic 1104 may receive signals 1302 representing an angle of attack associated with the rotorcraft blades to which different plasma arrays 108 are attached. The central control logic 1104 may also receive sensor signals 1304 generated by any number of different sensors associated with the rotorcraft and/or the rotorcraft blades. FIG. 14 described in more detail below provides various examples of these sensor signals 1304.

The central control logic 1104 may process the sensor signals 1304, the various control inputs 1106, and the signals 1302 representing the angle of attack, and output the control signals 1214. More specifically, the control signals 1214 may include individual control signals 1306a, 1306b, 1306c, and 1306d (collectively, individual control signals 1306). These individual control signals 1306a-1306d may correspond respectively to the plasma arrays 108a-108d. In addition, the individual control signals 1306a-1306d may represent all waveforms customized by the central control logic 1104 for the individual plasma arrays 108a-108d, based on the conditions represented by the control inputs 1106, the sensor signals 1304, and the angle of attack 1302.

FIG. 14 illustrates process flows, denoted generally at 1400, that the central control logic 1104 may perform in calculating the control signals 1214 for the various plasma arrays 108. For convenience of description, but not to limit possible implementations, certain elements described in previous drawings are carried forward into FIG. 14, and denoted by identical reference numbers.

Turning to the process flows 1400 in more detail, block 1402 represents a receiver of the sensor signals 1304. In the examples shown in FIG. 14, the sensor signals 1304 may include readings 1404 as obtained from one or more vibration sensors located at convenient points along the rotorcraft blades. In general, these vibration sensors may indicate any vibration forces that may be distributed along the radii of the rotorcraft blades.

The sensor signals 1304 may also include readings 1406 as obtained from one or more lift sensors. In general, these lift sensors may indicate lift velocities associated with the rotorcraft blades, or associated with the rotorcraft more generally. In addition, the lift sensors may indicate an actual lift velocity ($V_a$). As described in more detail below, the central control logic 1104 may compare this actual lift velocity ($V_a$) to a desired lift velocity ($V_d$), and may compute control signals 1214 that converge the actual lift velocity ($V_a$) toward the desired lift velocity ($V_d$) with help of the plasma arrays 108. More specifically, the central control logic 1104 may customize appropriate waveforms that drive one or more of the plasma arrays 108 to achieve this convergence.

In addition, the readings 1406 as obtained from the lift sensors may indicate actual acceleration ($A_a$). Similar to the processing described above in connection with converging the actual lift velocity ($V_a$) towards the desired lift velocity ($V_d$), these central control logic 1104 may also drive plasma arrays 108 so as to converge the actual acceleration ($A_a$) toward a desired acceleration ($A_d$).

The sensor signals 1304 may also include readings 1408 as obtained from one or more stability sensors. In some implementation scenarios, these stability sensors may be part of a pre-existing on-board stability monitoring system provided by the rotorcraft. In other implementation scenarios, the stability sensors may be customized as part of implementing this description, to achieve the functions described herein.

Decision block 1410 represents evaluating whether overall conditions at a given time, as indicated at least by the sensor signals 1304, are within an acceptable range (i.e., "normal"). Decision block 1410 may include applying any applicable thresholds to the conditions represented by the signals 1304. From decision block 1410, if the prevailing overall conditions are acceptable, the process flows 1400 may take Yes branch 1412 to block 1414, which represents continuing to monitor the sensor signals. As additional sensor readings become available over time, the process flows 1400 may return to block 1402 to receive and process these new sensor readings.

From decision block 1410, if the prevailing overall thresholded conditions become unacceptable, the process flows 1400 may take No branch 1416 to block 1418. For example, the sensor signals 1304 may indicate that a given rotorcraft blade is experiencing unacceptable levels of vibration, that the vibrations are distributed unacceptably along the radius of the rotorcraft blade, or the like. In other examples, the sensor signals 1304 may indicate that the rotorcraft blades, or the rotorcraft as a whole, are not achieving a desired velocity ($V_d$) or acceleration ($A_d$). In still other examples, the sensor signals 1304 indicate that the rotorcraft blades, or the rotorcraft as a whole, are experiencing some level of undesirable instability.

Block 1418 represents selecting one or more operational goals to address the unacceptable overall operating conditions detected in block 1410. For example, if one or more of the rotorcraft blades are experiencing unacceptable levels of vibration or instability, block 1418 may include selecting an operational scenario to address those levels of vibration or instability. As another example, if the rotorcraft blades or the rotorcraft are not providing acceptable lift or acceleration, block 1418 may include selecting an operational scenario to increase the lift or acceleration.

Block 1420 represents receiving any number of input parameters, current at a given time. Examples of these input parameters may include any of the control inputs 1106 described previously, as well as parameters representing the angle of attack 1302. FIG. 13 carries forward non-limiting examples of these input parameters, including the circumferential velocity ($V_e$) 1216, the wind velocity ($V_w$) 1212, the flight velocity ($V_f$) 1206, signals 1208/1210 indicating whether a given rotorcraft blade is advancing or retracting. However, implementations of this description may process any number of the foregoing signals, or other signals, without departing from the scope and spirit of the present description.

Block 1422 represents defining sensor readings that would correspond to achievement of the operational goal scenarios selected in block 1418. Examples of these goal sensor readings are represented at 1424 (e.g., vibration), 1426 (e.g., lift), and 1428 (e.g., stability). Other examples, such as drag forces 1430, of sensor readings are possible as well.

Block 1434 represents driving the control signals (e.g., 1214) to any number of the plasma arrays (e.g., 108). In different implementation scenarios, block 1434 may include driving appropriate control signals to one or more of the plasma arrays, to achieve the operational goal scenario selected in block 1418. For example, referring to the rotorcraft blade 1204a in FIG. 12, block 1434 may include creating and driving customized waveforms for one or both of the installed plasma arrays 108c or 108d. In turn, the process flows 1400 may return to block 1414 to monitor the sensor signals. Afterwards, the process flows 1400 may repeat blocks 1402 and 1410 to determine whether the customized waveforms, as driven to the plasma arrays, have restored operating conditions to an acceptable range. Blocks 1418-1434 may be repeated as appropriate to bring the operating conditions within the acceptable range.

Figure 15:
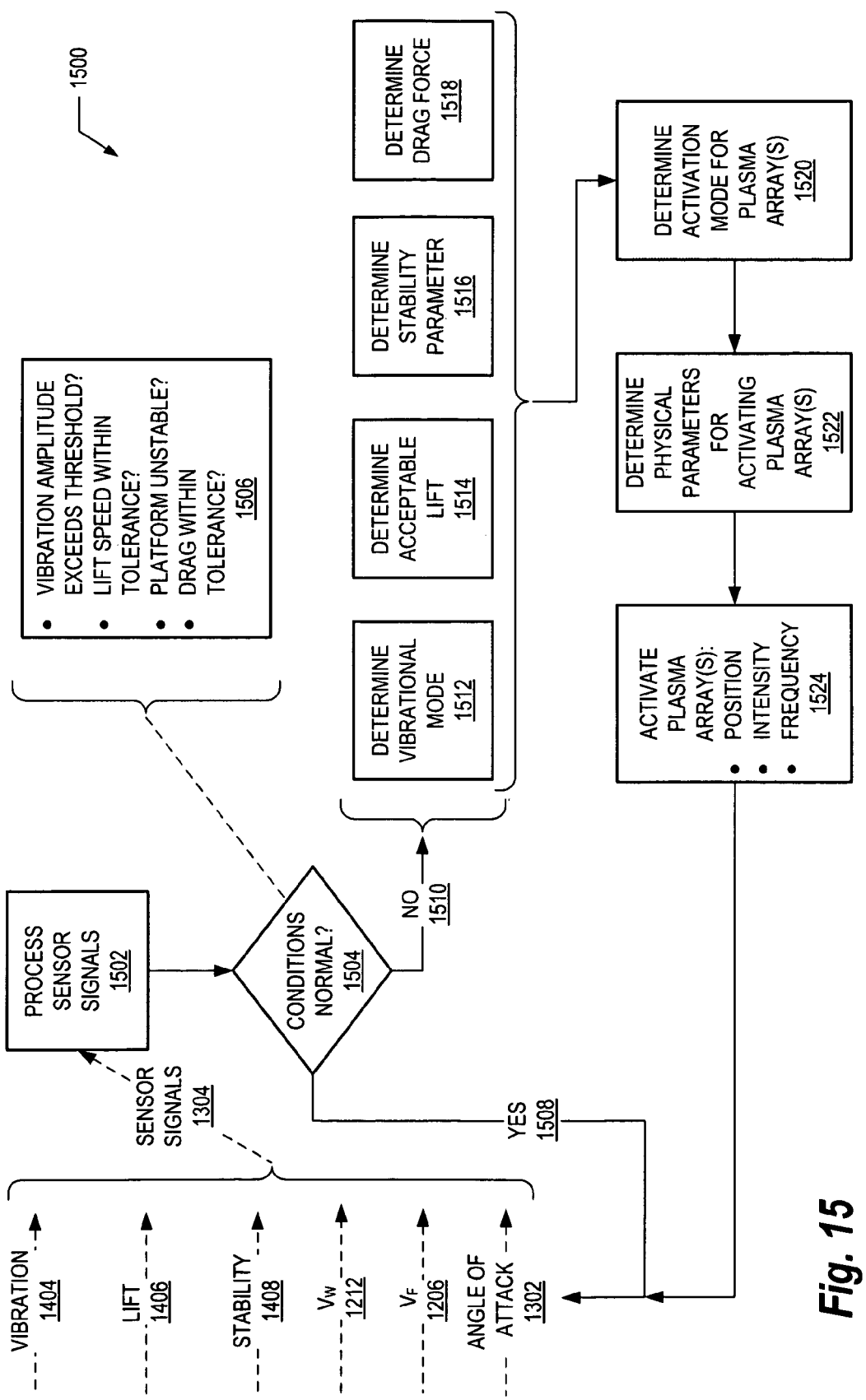
FIG. 15 is a flowchart illustrating further processes that analyze various scenarios in connection with activating the plasma arrays.

FIG. 15 illustrates further process flows, denoted generally at 1500, that analyze various qualitative inputs in connection with activating the plasma arrays. Turning to the process flows 1500 in more detail, block 1502 represents processing signals received from any number of different sensors. For ease of reference, FIG. 15 carries forward examples of sensor signals, denoted collectively at 1304. In addition, examples of the sensor signals 1304 may include, but are not limited to: readings or signals 1404 from one or more vibration sensors, readings or signals 1406 from one or more lift sensors, readings or signals 1408 from one or more stability sensors, readings or signals 1212 from one or more sensors that indicate wind velocity, readings or signals 1206 from one or more sensors that indicate flight velocity, and/or readings or signals 1302 from one or more sensors that indicate an angle of attack.

Decision block 1504 represents evaluating or analyzing whether overall flight conditions as represented at least by the sensor signals 1304 are within acceptable tolerances at a given time. As illustrated generally at 1506, the decision block 1504 may include evaluating several qualitative factors that represent overall flight conditions. For example, block 1504 may include evaluating whether a vibration amplitude exceeds any applicable thresholds. More specifically, block 1504 may include evaluating whether vibration modes and/or amplitudes associated with several different rotorcraft blades are within applicable thresholds. Examples of vibration-related factors may include, but are not limited to, bending, torsion, flutter, and the like. However, implementations of this description may operate with other examples of vibration-related factors, without departing from the scope and spirit of this description. These factors may vary, depending on the characteristics of particular rotorcraft blades, platforms, or airframes As represented by block 1506, block 1504 may include evaluating whether a lift speed is within tolerance at a given time. In different particular performance scenarios encountered in implementations of this description, a lift speed at a given time may be either higher or lower than a given optimal speed. Particular quantitative inputs may vary in different implementations of this description.

As shown in block 1506, block 1504 may include evaluating whether the overall performance of a rotorcraft platform is unstable. Particular quantitative inputs may depend upon various factors applicable to a mission performed by the rotorcraft.

As represented by block 1506, block 1504 may include evaluating whether drag experienced by a rotorcraft platform is excessive at a given time. Particular quantitative inputs may depend upon various factors applicable to a mission performed by the rotorcraft.

If, at a given time, the overall flight conditions are within acceptable tolerances, the process flows 1500 may take Yes branch 1508 as indicated to continue monitoring the sensor signals 1304. Returning to decision block 1504, if overall flight conditions are not within acceptable tolerances at a given time, the process flows 1500 may take No branch 1510 to determine various goals to be achieved by activating the plasma actuating cascade arrays as described herein. For example, block 1512 represents determining one or more vibrational modes, block 1514 represents determining lift rates, block 1516 represents determining one or more stability parameters, and block 1518 represents determining drag forces. The examples represented in blocks 1512-1518 correspond to the example performance parameters represented in block 1506. However, other parameters related to rotorcraft performance are possible, without departing from the scope and spirit of this description.

Block 1520 represents determining an activation mode for the plasma arrays, based upon the performance goals determined in blocks 1512-1518. For example, block 1520 may include selecting one or more plasma arrays for activation to address excessive or undesirable vibration, insufficient lift or stability, to reduce drag, and the like. Block 1522 represents determining physical parameters applicable to activating different plasma arrays, based upon the activation modes determined in block 1520. Some implementations may or may not have blocks 1520 and 1522 combined in one block (not shown).

In turn, block 1524 represents activating the selected plasma arrays based on, for example, positions of particular plasma arrays as located on different rotorcraft blades. In addition, different plasma arrays may be activated with different intensities, depending upon their locations on different rotorcraft blades and upon the operational goals determined in blocks 1512-1518. Based on similar factors, these different plasma arrays may be activated with different frequencies of operation.

The foregoing description of FIGS. 14 and 15 provides several examples of qualitative inputs. However, implementations of this description may also consider and analyze quantitative inputs.

Having provided the above description of FIGS. 1 through 15, several observations are noted. The vertical and horizontal disbanding or cascading techniques as described and illustrated herein may generate plasma clusters that are closer together, as compared to previous techniques. In the aggregate, these generated plasma clusters may be larger, as compared to these previous techniques. Thus, these larger plasma clusters may induce greater movements of air, and provide greater levels of control over the separation point or over a tip vortex or span- or stream-wise airflow on a given rotorcraft blade.

In addition, by providing two-dimensional disbanding of the plasma generation units, the electrode-dielectric units described herein may reduce or minimize the effect of counterforces acting between neighboring electrode pairs, as compared to the previous techniques. In some previous approaches, multiple plasma generation units may be placed on a single dielectric. However, if these plasma generation units are placed too close together, then the plasma clusters generated by neighboring units may exert counterforces on one another, reducing the overall size of the plasma clusters.

In some implementations, the various electrodes and dielectrics described herein may have thicknesses of approximately 0.5 mm or below. Cascaded arrays of plasma generating units constructed to this scale may provide more plasma-generating units per unit length of airfoil, as compared to previous techniques. With more plasma-generating units per unit length of airfoil, more plasma may also be generated per unit length of a blade.

Reduced power consumption may result from managing and controlling airflow locally at the plasma-generating units.

In contrast, previous techniques may control airflow from a centralized location that manages the plasma-generating units remotely.

Although the previous Figures illustrate certain example configurations of the plasma-generating units, implementations of this description may also include plasma-generating units having other configurations as well. These configurations may be suitable for inducing vortex air patterns, or other types of complex airflows.

The subject matter described above is provided by way of illustration only and does not limit possible implementations. Various modifications and changes may be made to the subject matter described herein without following the example embodiments and applications illustrated and described, and without departing from the true spirit and scope of the present description, which is set forth in the following claims.

What is claimed is:

1. A method of actively controlling airflow over at least one rotorcraft blade, the method comprising:
    providing at least one plasma actuated cascade array, wherein the plasma actuated cascade array includes a plurality of dielectrics and a plurality of electrodes comprising a first electrode disposed along a first dielectric, a second electrode sandwiched between the first dielectric and a second dielectric, and at least a third electrode, wherein the second dielectric is sandwiched between the second and third electrodes, wherein the electrodes and the dielectrics are electrically operative to generate plasma clusters and to induce directional airflows associated with the plasma clusters; and
    configuring at least one plasma actuating cascade array based on, at least in part, one characteristic of the rotorcraft blades.

2. The method of claim 1, wherein configuring the at least one plasma actuated cascade array includes adjusting a length of a portion of at least two of the dielectrics, as exposed between three electrodes adjacent to the dielectrics, based at least in part on the characteristic of the rotorcraft blades.

3. The method of claim 1, wherein configuring the at least one plasma actuated cascade array includes adjusting the lengths of a plurality of portions of the dielectrics, as the portions of the dielectrics are exposed between respective pairs of electrodes, based at least in part on the characteristic of the rotorcraft blades.

4. The method of claim 1, wherein configuring at least one plasma actuated cascade array includes configuring the plasma actuated cascade array based on a cross-sectional profile of the rotorcraft blade.

5. The method of claim 1, wherein configuring at least one plasma actuated cascade array includes configuring the plasma actuated cascade array based on a wind speed expected to be encountered by the rotorcraft blade.

6. The method of claim 1, wherein configuring at least one plasma actuated cascade array includes configuring the plasma actuated cascade array based on response to mechanical loads, wherein the mechanical loads include vibration, lift forces, drag forces, destabilizing, or misbalancing forces as encountered by the rotorcraft blade.

7. The method of claim 1, wherein configuring at least one plasma actuated cascade array includes configuring the plasma actuated cascade array to have a first angled configuration that is chosen based upon the characteristic of the rotorcraft blade.

8. The method of claim 7, further comprising configuring at least a further plasma actuated cascade array to have a further angled configuration that is chosen based upon a further characteristic of the rotorcraft blade.

9. A method of installing at least one plasma actuated cascade array onto a rotorcraft blade, for actively controlling airflow over the rotorcraft blade, the method comprising:
    providing the plasma actuated cascade array, wherein the plasma actuated cascade array includes a plurality of dielectrics and a plurality of electrodes comprising a first electrode disposed along a first dielectric, a second electrode sandwiched between the first dielectric and a second dielectric, and at least a third electrode, wherein the second dielectric is sandwiched between the second and third electrodes, wherein the electrodes and the dielectrics are electrically operative to generate plasma clusters and to induce directional airflows associated with the plasma clusters; and
    installing the plasma actuating cascade array onto the rotorcraft blade.

10. The method of claim 9, wherein installing the plasma actuated cascade array includes installing the plasma actuated cascade array onto a surface of the rotorcraft blades.

11. The method of claim 9, further comprising installing at least a second plasma actuated cascade array onto the rotorcraft blade.

12. The method of claim 9, further comprising installing at least a second plasma actuated cascade array onto at least another rotorcraft blade.

13. The method of claim 9, wherein installing the plasma actuated cascade array includes installing the plasma actuated cascade array at least partially into a recess defined by the rotorcraft blade at any specific area on the entire blade.

14. A method of actively controlling at least one direction of airflow passing over a rotorcraft blade using at least one plasma actuated cascade array installed onto the rotorcraft blade, the method comprising:
    providing electrical power in the form of a custom waveform to the plasma actuated cascade array comprising a first electrode disposed along a first dielectric, a second electrode sandwiched between the first dielectric and a second dielectric, and at least a third electrode, wherein the second dielectric is sandwiched between the second and third electrodes, wherein the custom waveform is defined so as to actively control at least one airflow passing over the rotorcraft blade by generating at least one plasma cluster;
    generating at least one plasma cluster proximate the plasma actuated cascade array during a first phase of the electrical power;
    moving the plasma clusters along the plasma actuated cascade array in response to a further phase of the electrical power; and
    generating directional airflow in response to movement of the plasma clusters.

15. The method of claim 14, further comprising modifying movement of the airflow over the rotorcraft blade in response to directional airflow generated using the plasma actuated cascade array.

16. The method of claim 15, wherein modifying movement of the airflow over the rotorcraft blade includes moving the airflow more closely to or further from the rotorcraft blade.

17. The method of claim 14, further comprising:
    providing further electrical power in the form of a further custom waveform to at least a further plasma actuated cascade array installed onto the rotorcraft blade or onto a further rotorcraft blade, wherein the further custom waveform is defined to actively control at least a further airflow passing over the rotorcraft blade or the further rotorcraft blade;

generating at least a further plasma cluster proximate the further plasma actuated cascade array during a first phase of the further electrical power;

moving the further plasma cluster along the further plasma actuated cascade array in response to a further phase of the further electrical power; and generating further directional airflow in response to movement of the further plasma cluster.

18. The method of claim 17, wherein generating the directional airflow includes generating airflow in a first direction, and wherein generating the further directional airflow includes generating airflow in a second direction that is different than the first direction.

19. The method of claim 18, further comprising combining the directional airflow and the further directional airflow into a combined airflow.

20. The method of claim 19, further comprising coordinating the electrical power and the further electrical power as supplied respectively to the plasma actuated cascade array and the further plasma actuated cascade array, to coordinate movement of the directional airflow relative to the further directional airflow.

21. An array of electrodes for generating plasma for actively controlling airflow over at least one rotorcraft blade, the array comprising:

a first electrode disposed along a first dielectric;

a second electrode sandwiched between the first dielectric and a second dielectric;

at least a third electrode, wherein the second dielectric is sandwiched between the second and third electrodes;

at least one power supply providing electrical power to the first, second, and at least third electrodes; and a power supply controller operative to control the power supply, so as to regulate the electrical power supplied to the first, second, and at least third electrodes, and so as to cause the first, second, and at least third electrodes to generate and move plasma, thereby actively controlling airflow over the at least one rotorcraft blade.

22. The array of claim 21, wherein the power supply is configured to apply a waveform to the first, second, and third electrodes.

23. The array of claim 22, wherein the first, second, and third electrodes are configured to generate respective plasma clusters in response to a first phase of a cycle of the applied waveform.

24. The array of claim 23, wherein the first, second, and third electrodes are configured to move the plasma clusters in response to a further phase of a cycle of the applied waveform.

* * * * *